United States Patent [19]
Luk

[11] Patent Number: 5,689,670
[45] Date of Patent: Nov. 18, 1997

[54] DATA TRANSFERRING SYSTEM WITH MULTIPLE PORT BUS CONNECTING THE LOW SPEED DATA STORAGE UNIT AND THE HIGH SPEED DATA STORAGE UNIT AND THE METHOD FOR TRANSFERRING DATA

[76] Inventor: Fong Luk, 2926 Lambeth Ct., San Jose, Calif. 95132

[21] Appl. No.: 671,106

[22] Filed: Oct. 7, 1996

Related U.S. Application Data

[63] Continuation of Ser. No. 745,051, Oct. 7, 1991, abandoned, which is a continuation of Ser. No. 324,723, Mar. 17, 1989, abandoned.

[51] Int. Cl.$^6$ ............................. G06F 9/38; G06F 13/00
[52] U.S. Cl. ................................ 395/383; 395/440
[58] Field of Search ........................ 395/383, 382, 395/381, 379, 378, 440

[56] References Cited

U.S. PATENT DOCUMENTS

| | | | |
|---|---|---|---|
| 4,200,927 | 4/1980 | Hughes et al. | 395/375 |
| 4,439,827 | 3/1984 | Wilkes | 395/375 |
| 4,476,526 | 10/1984 | Dodd | 395/425 |
| 4,594,659 | 6/1986 | Guenthner et al. | 364/200 |
| 4,679,141 | 7/1987 | Pomerene et al. | 395/375 |
| 4,691,277 | 9/1987 | Kronstadt et al. | 364/200 |
| 4,701,844 | 10/1987 | Thompson et al. | 364/200 |
| 4,724,518 | 2/1988 | Steps | 395/425 |
| 4,755,935 | 7/1988 | Davis et al. | 364/200 |
| 4,825,357 | 4/1989 | Ovies et al. | 395/275 |
| 4,843,542 | 6/1989 | Dashiell et al. | 395/425 |
| 4,847,753 | 7/1989 | Matsuo et al. | 364/200 |
| 4,860,192 | 8/1989 | Sachs et al. | 364/200 |
| 4,860,197 | 8/1989 | Lengendort | 364/200 |
| 4,881,170 | 11/1989 | Morisada | 364/200 |
| 4,894,772 | 1/1990 | Langendorf | 364/200 |
| 4,974,154 | 11/1990 | Matsuo | 395/375 |
| 4,984,154 | 1/1991 | Hanatani et al. | 364/200 |
| 5,038,278 | 8/1991 | Steely, Jr. et al. | 395/425 |
| 5,050,068 | 9/1991 | Dollas et al. | 395/375 |
| 5,051,068 | 9/1991 | Dollas et al. | 364/200 |
| 5,257,367 | 10/1993 | Goodlander et al. | 395/600 |

Primary Examiner—Thomas G. Black
Assistant Examiner—Jack M. Choules
Attorney, Agent, or Firm—Bo-In Lin

[57] ABSTRACT

A data processing system using a prefetch mechanism with high speed cache memory to increase the processing speed. Data is prefetched from a low speed main memory to the cache memory for data transfer instructions via multiple ports. For a program control transfer instruction, the prefetch mechanism prefetches instruction for each possible program path, stores them in the cache memory and continues with the prefetch processes.

3 Claims, 3 Drawing Sheets

DATA TRANSFERRING SYSTEM WITH MULTIPLE PORT BUS CONNECTING THE LOW SPEED DATA STORAGE UNIT AND THE HIGH SPEED DATA STORAGE UNIT AND THE METHOD FOR TRANSFERRING DATA

This application is a continuation of application Ser. No. 07/745,051, filed Oct. 7, 1991, now abandoned, which was a continuation of application Ser. No. 07/324,723, filed Mar. 17, 1989, now abandoned.

BACKGROUND OF THE INVENTION

1. Field of the Invention

This invention relates generally to a data processing systems and more particularly to data and instruction prefetch mechanism for the Central Processing Unit (CPU).

2. Description of the Prior Art

The current technique used for the data or instruction prefetch mechanism for the CPU is simply to prefetch the next instruction or data on the line or in some other more sophisticated methods, the perfetched decision is based on past history activity of the system. Illustrative examples of the data or instruction prefetch technique can be found in U.S. Pat. Nos. 4,490,782 and 4,594,659.

These current techniques perform adequately in some applications but in order to achieve adequate performance, a fairly large amount of expensive high speed cache memory is needed and in many applications, their performance becomes ineffective.

SUMMARY OF THE INVENTION

It is an object of the present invention to provide for data processing system with a data and instruction prefetch mechanism for achieving superior performance with an only minimum amount of cache memory and un-degraded performance in most of the applications which current technique cannot perform.

It is another object of the present invention to solve the bandwidth bottleneck problem between the CPU and the memory.

The above objective can be achieved in this invention by three novel mechanisms, namely: prefetch processing unit (PPU), parallel cache unit (PCU) and parallel memory unit (PMU).

The PPU can preprocess CPU program. When a data transfer instruction from the main memory is encountered, the PPU prefetches the data and transfers it to the cache memory.

If a program control transfer instruction (e.g. branching) is encountered, the PPU prefetches instructions from two or more locations, to which the program control may be transferred. One prefetch processing sub-element (PPSE) is assigned to each possible program path to continue processing until all PPSE or cache memories are exhausted.

DETAILED DESCRIPTION OF THE PREFERRED EMBODIMENT

Figure 1:
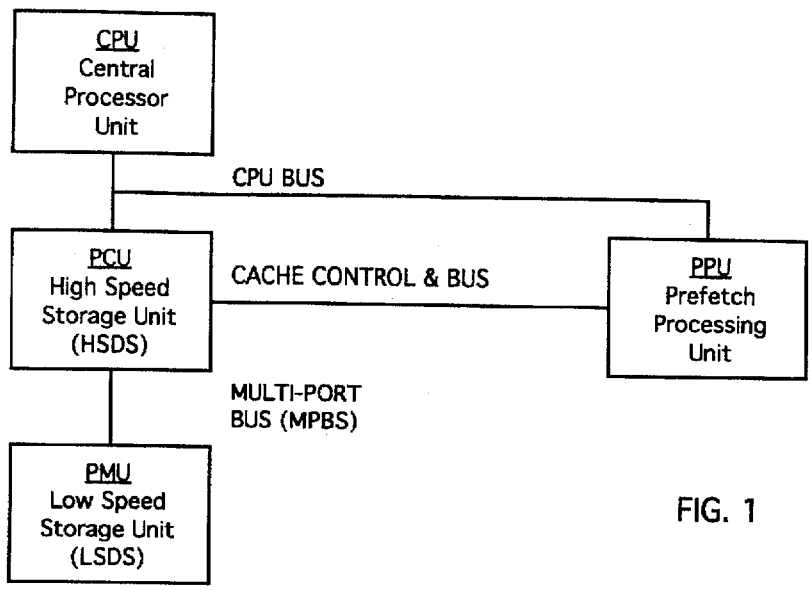
FIG. 1 shows the basic prefetch system organization of the present invention.

The basic block diagram of the present invention is shown in FIG. 1. The figure includes a Central Processing Unit CPU, a Prefetch Processing Unit PPU, Prefetch Cache Unit PCU, and a slow speed storage or Parallel Memory Unit PMU.

These units are interconnected with buses. The CPU bus, connecting CPU, PPU and PCU, supplies addresses and data. From the PCU, a low speed multiple address and data bus (MPBS) is connected to the PMU. The PCU and the PPU are interconnected through a cache bus and a set of prefetch control lines.

Figure 2:
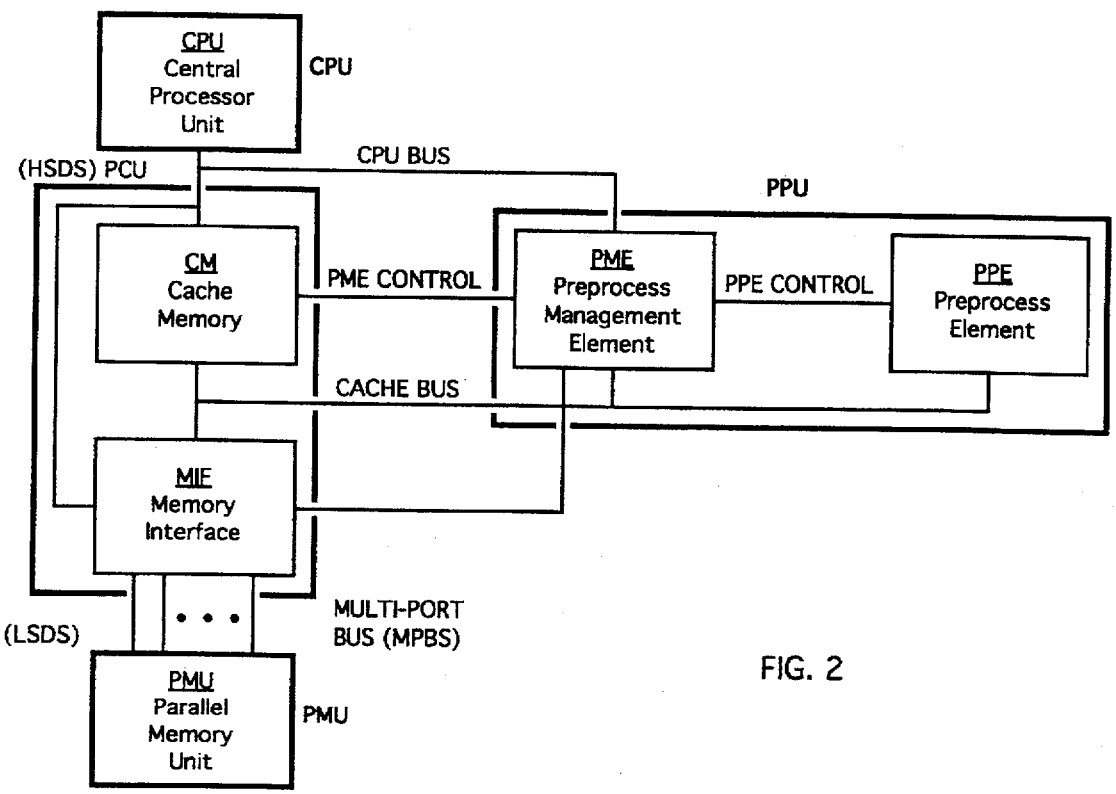
FIG. 2 shows the function blocks in the prefetch system of the present invention.

The functional blocks within these units are shown in FIG. 2. The PCU contains a cache memory block CM and a memory interface block MIF. The PPU contains prefetch processing element PPE consisting of a number of Prefetch Processing Sub-Elements PPSE, and a Prefetch Management Element PME, which consists of an Execution Interface block EIF and a Pre-Processing Management Sub-Element PMSE.

According to the present invention, the data processing system comprises: a central processing unit, a prefetch processing unit, a high speed data storage unit, CPU address bus and CPU data bus interconnecting the CPU, the high speed data storage unit and the prefetch processing unit, a high speed CPU bus with the CPU control signals, a low speed data storage unit and multiple port bus interconnecting said low speed data storage unit and said high speed data storage unit and having a wider data path width than that of said high speed data storage unit to allow more data to be transferred in parallel simultaneously between said high speed data storage unit and low speed data storage unit to and from said low speed data storage unit than between said CPU and said high speed data storage unit in order to compensate for the low speed of said low speed data storage unit. In one of the preferred embodiment, the prefetch processing unit has a prefetch management element and multiple number of prefetch processing sub-elements.

The method according to the present invention comprises steps of: (A) scanning signals from the CPU to determine whether operating of the CPU should be a data output operation, data input operation or instruction fetch operation wherein (a) when data output operation is detected, performing the steps of (i) receiving the signals including data and associated address from the CPU and strong in the HSDS, if the HSDS is not full, (ii) holding up the output operation whenever the HSDS is full, (iii) transferring concurrently with the receiving and storing step the signals stored in the HSDS to the LSDS through the multiple port bus; (b) when the data input or instruction fetch operation is detected in the CPU, performing the steps of (I) checking contents of the HSDS to determine whether any requested data or instructions of the CPU are in the HSDS, (ii) transferring via the high speed CPU bus the requested data or instructions to the CPU, if the requested data or instructions are in the HSDS, (iii) holding up the input operation of the CPU, if the requested data or instructions are not in the HSDS until the requested data or instructions are retrieved from the LSDS; (iv) prefetching via said multiple port bus the requested data or instructions from the LSDS to the HSDS together with data in an adjacent location to the requested data.

According to the present invention, the prefetch processing unit has preprocess management sub-elements (PMSE) and multiple number of preprocess sub-elements (PPSE), and the prefetching of instructions from the LSDS to the HSDS is accomplished by algorithms with steps of: (a) monitoring the CPU bus initially with the PMSE, capturing the address location of instruction being fetched by said CPU, assigning I number of the PPSE to fetch and decode the instruction and I-1 instructions immediately following the instruction in consecutive order via the MPBS when the address location is captured by the PMSE, storing also in the PMSE status to indicate these I numbers of the PPSE being used; (b) if one or more of the I numbers of the PPSE decodes a branch instruction of the CPU, having the PPSE fetch instruction from branched location and instruction from unbranched location, repeating by the PPSE this decoding and fetching operation following one of the program paths from the branched location or from the unbranched location, assigning one of the PPSE which has not been used to operate on other the program paths; and, (c) keeping PMSE to monitor the CPU bus for detecting branching operation of the CPU and capturing the branched and unbranched locations, releasing by the PMSE all the PPSE's which are assigned to the program path which the is not taken by the program executed by the CPU. Furthermore, when a data read instruction is detected, the data to be read are fetched from the LSDS to the HSDS via the MPBS, if locations of the data to be read can be calculated from data contained in the data read instructions.

Therefore, according to the present invention, the prefetch processing unit detects whether any one or more ports of the MPBS is in idle state, i.e. no data transfer occurring in that port, the PPU uses the port to transfer from the LSDS to the HSDS the data or instruction of the CPU in locations which are determined by the access pattern, i.e. the direction and the difference of address locations between each the instruction of data, of last N (a predetermined number) input operations or instruction operations of the CPU;

for example:

(a) if last N input operations or instruction fetch operations access data or instructions in location downward one by one, k (a predetermined number) number of data or instructions in consecutive order immediately following the location accessed by last input operation or instruction fetch operation is prefetched;

(b) if last the N input operations or instruction fetch operations access data or instructions in locations upward and spaced by three locations, data or instructions in the k number of locations spaced by three above the location accessed by last input operations or instruction fetch operations are prefetched and so forth;

(c) if the access pattern of last the N input operations or instruction fetch operations is random, the access pattern of last two input operations or instruction fetch operations is used for prefetch.

Unlike the techniques used by the prior art, the prefetch processing unit transfers the data and instruction from the LSDS to HSDS in an algorithm determined by preprocessing the program to be executed by the CPU to extract all data which may affect program flow and data loading address from the program and using these data to formulate an optimal prefetch algorithm with least cache memory for the CPU to run the program.

A method for prefetching computer program instructions from a low speed data storage unit is disclosed by the present invention which comprises the steps of: (A) scanning the program concurrent with the execution of the computer program by CPU; (B) prefetching instructions from the low speed data storage unit from all locations to where the program control may be transferred; (C) storing the prefetched instructions in a high speed data storage unit; and (D) continuing the program scanning, instruction prefetching and storing operation following each program path. In one of the preferred embodiment, the method for prefetching computer program instructions from a low speed data storage unit further comprises the step of setting free unneeded high speed data storage unit.

According to the present invention, a prefetch data processing system comprises a prefetch processing unit which is interconnected with central processing unit and prefetch cache unit through CPU bus and a cache bus and a set of prefetch control lines. The prefetch processing unit comprising a number of prefetch processing sub-elements for processing the CPU branch program instructions and a prefetch management element for the management and assignment of an available prefetch processing sub-element to process appropriate CPU program branch. In the prefetch data processing system according to another preferred embodiment of the present invention, the prefetch management element further comprises an execution interface block for setting free used cache memory in the prefetch cache unit and a pre-processing management sub-element for assignment and release of unneeded prefetch processing sub-elements.

Figure 3:
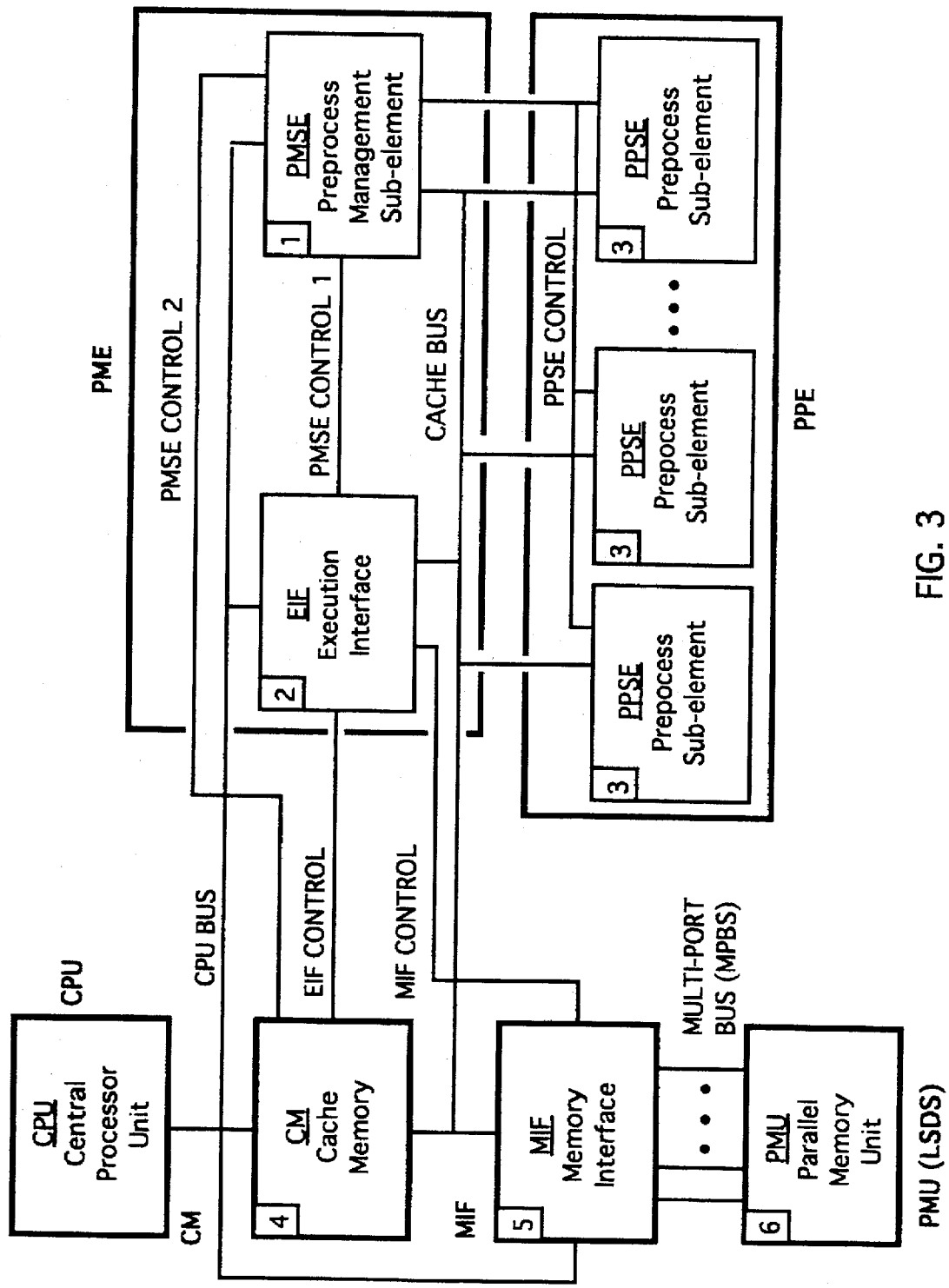
FIG. 3 shows the hierarchy diagram of the present invention.
Figure 4:
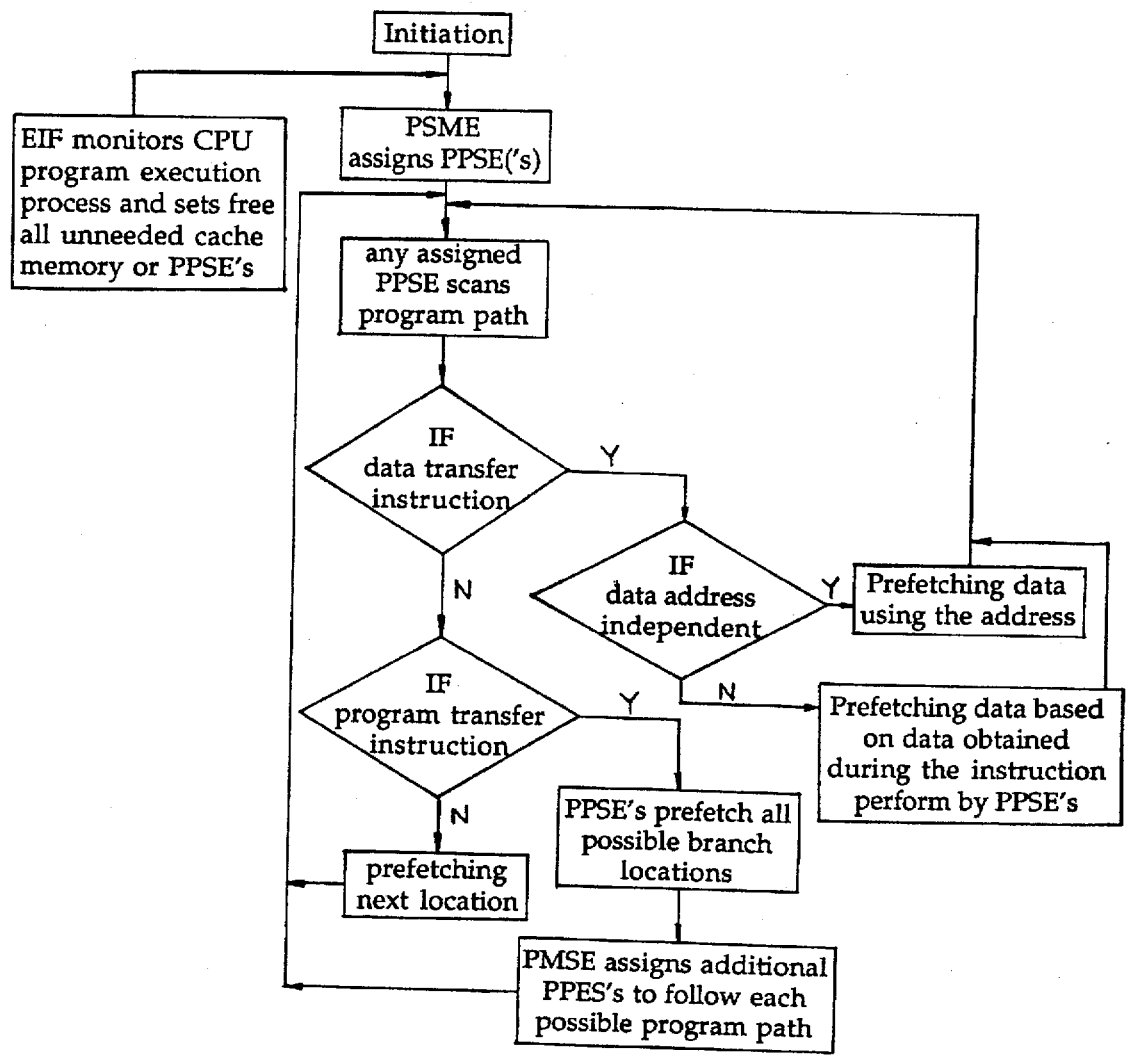
FIG. 4 shows a flow chart of the steps performed by the present invention.

The hierarchy of this invention is shown in FIG. 3.

(a) The PPU consists of prefetch processing elements PPE with a number of PPSE's and a prefetch management element PME with an EIF and a PMSE. These PPE's are used for processing the CPU program instructions, and the PME is used for the management and assignment of an available PPSE in the PPE to process appropriate CPU program branch and is also used for other supporting tasks.

At system initiation, the PMSE in PME assigns one of the PPSE in the PPE to fetch CPU program instructions from the main memory and scans for program control transfer instructions and instructions requiring data transfer from memory.

When an instruction requiring data transfer from main memory is encountered, the PPU prefetches the data and it transfers into cache memories if the address is not dependent on previous CPU calculations. Otherwise, based on data obtained during the instruction scan process, a variety of loading schemes can be performed according to different types of instructions of any specific CPU. For example, the PPU may use the address of the last data loading (by the same type of instruction) as a center point C to load a block of data in length of 2n+1 from memory address ranging from C−n to C+n so common CPU increment and decrement address data loading can be covered by the PPU.

When a program control transfer instruction from the main memory is encountered, the assigned PPSE prefetches instructions from all locations to where the program control may be transferred and the PMSE assigns the PPE to each possible program path to continue the above scan and instruction prefetch process until all PPE or cache memory are exhausted.

During the above process, the EIF in PME monitors the CPU program execution process and sets free all unneeded cache memory or PPE accordingly. For example, whenever the CPU completes a program control transfer, the EIF sets free all PPE's running on those invalid paths and the PSME assigns them to process the valid path. Similar action is taken for the cache memory if the CPU completes an instruction requiring data transfer.

b) The PCU is a high speed cache memory unit consisting of a CM and a MIF. The PCU is capable of transferring multi-data words to and from the PMU in a single cycle via multiple parallel data paths (MPBS) and simultaneously be accessed by the CPU via another port. Circuitry is also provided in PCU to translate the CPU address to corresponding cache memory. For CPU memory store operations, data are buffered and transferred in parallel to PMU in a single cycle.

In a concurrent operation, whenever the multiple port bus is free, the prefetch processing unit prefetches into the CPU data or instructions in locations which are determined by the access pattern of last m input operations or instruction fetch operations, where m is a predetermined number. For example, if the last m operations or instruction fetch operations access data or instructions in location downward one by one, k number, a predetermined number, of data or instructions following the location accessed by the last input operations following the location accessed by last input operation or instruction fetch operation is prefetched. If the last m input operations or instructions or instruction fetch operations access data or instruction fetch operations access data or instructions in locations upwards and spaced by three locations, the data or instructions in the k number of locations spaced by three above the location accessed by the last input operations or instruction fetch operations is prefetched and so forth.

If the access pattern of the last m input operations or instruction fetch operations is random, the access pattern of the last two input operations or instruction fetch operations is used for prefetch.

c) The PMU is a relatively slow memory unit with multiple parallel data paths (MPBS) going to the PCU.

Since the PPU does not execute the CPU instruction and can fetch data from memory through multiple parallel data paths (MPBS), the PPU can always run ahead of the CPU to prefetch for the CPU in parallel fashion and thus solve the transfer bandwidth bottleneck problem between CPU and memory.

Another advantage of the present invention is that by being able to process CPU program instructions ahead of CPU program execution, the PPU can make prefetch decisions based on actual data and not on past history or statistics. This novel prefetch mechanism can accurately prefetch the right data with very few exceptions. In consequence, superior performance can be achieved with minimum amount of high speed cache memory.

The functions of the different blocks are described as follows:

(1). PMSE (Preprocessing Management Sub-Element) In PME Has the Following Functions:
 (a) Assignment and release of PPSE;
 (b) Getting initial CPU program counter to start operation;
 (c) Cache linkage management.

(2) EIF (Execution Interface Unit) In the PME Has Several Functions:
 (a) Detecting CPU cycles (i.e. branching, data fetch, instruction fetch) and controlling the cache memory CM to provide data and to store data accordingly;
 (b) Detecting any misses in the cache memory of PCU;
 (c) Holding CPU to wait if there is a miss and fetching data from memory or if PCU is full during output operation and storing data to memory (PMU);
 (d) Setting free used cache memory space.

(3) PPSE (Prefetch Processing Sub-Element) In PPE Has the Following Functions:
 (a) Fetching CPU program instructions from the main memory.

(b) Scanning the CPU program for program control transfer instruction and instructions requiring data transfer from memory, and flag PMSE into appropriate action.

(4) CM (Cache Memory) In PCU Has the Following Functions:
 (a) Temporary storage of program instructions and data;
 (b) Loading and storing data to and from PMU via MIF;
 (c) Furnishing the data to CPU via CPU bus.

(5) MIF (Memory Interface Unit) Has the Following Functions:
 (a) Fetching and storing data to and from the Memory Unit PMU via a number of parallel channels;
 (b) Detecting and resolving bus contention from the parallel channels.

(6) PMU (Parallel Memory Unit) Is a Relatively Slow Memory Unit With Multiple Parallel Data Paths Going To the PCU.

A second embodiment of this invention is intended for a dedicated controller or a data processing system running a single task at a time. The difference in the second embodiment is in the PPU which is programmable during run time. A software or hardware preprocessor can be designed to process the program to be run beforehand, to calculate in each program step the address in which data is to be accessed and to formulate a best fit prefetch scheme for this program. All this information is programmed into the PPU. During run time, the PPU prefetches data according to the pre-formulated best fit prefetch scheme so best performance with least cache memory can be achieved and the complexity of the PPU can be greatly reduced.

What is claimed is:

1. A method for transferring data between a high speed data processing system (DPS) and a low speed data storage (LSDS) unit, said system including a central processing unit (CPU), a prefetch processing unit (PPU) including a preprocess management sub-element (PPME) and a plurality of preprocess sub-elements (PPSEs), and a high speed data storage (HSDS) unit wherein said CPU, said PPU, and said HSDS are interconnected with a CPU address bus and a CPU data bus, and said LSDS and HSDS are interconnected with a multiple port bus (MPBS), wherein said MPBS having a data path wider than said CPU data bus to allow more data transferred in parallel between said HSDS and said LSDS at a lower speed than between a data transfer between said CPU and said HSDS, said method comprising the steps of:

(a) scanning signals from said CPU for determining whether an operation of said CPU is a data output operation, a data input operation or an instruction fetch operation;

(b) when an data output operation of said CPU is detected, holding up said output operation if said HSDS is full and receiving said signals from said CPU including data and an associated address, storing said signals in said HSDS if said HSDS is not full and transferring, concurrently with said step of receiving and storing said signals in HSDS, said signals stored in said HSDS to said LSDS through said multiple port bus;

(c) when a data input or an instruction fetch operation of said CPU is detected, checking said HSDS for determining whether said HSDS containing required data or instructions for said data input or instruction fetch operation of said CPU and (i) if said HSDS contains said required data or instructions, transferring said required data or instructions from said HSDS to said CPU; (ii) if said HSDS does not contain said required data or instructions, holding up said data input or instruction operation until said required data or instructions are retrieved from said LSDS; (iii) retrieving said required data or instructions from said LSDS; and (iv) prefetching additional prefetched data or instructions in adjacent locations of said required data or instructions from said LSDS for transferring said required data or instructions together with said additional prefetched data or instructions to said HSDS through said multiple port bus, wherein said step of prefetching additional prefetched data or instructions further includes the steps of:

(iv-a) monitoring said CPU bus initially with said PMSE for capturing an address location of an instruction being fetched by said CPU from said LSDS and assigning I number of PPSE, wherein I being a predetermined integer number, to fetch and decode said instruction being fetched by said CPU and (I-1) instructions immediately following said instruction in consecutive order via said MPBS when said address location for said instruction is captured by said PMSE, then storing said I number in said PMSE for indicating said I number of PPSEs being assigned;

(iv-b) if one of said I number of PPSEs decodes a branch instruction for said CPU to execute multiple program paths includes an unbranched instruction and a plurality of branched instructions each with a branch location in said LSDS, applying said PPSE for fetching said an unbranched instruction and said branched instructions from said branch location in said LSDS and continuing said decoding and fetching operation for said unbranched instruction and assigning a new PPSE for each of said branched instruction for performing said decoding and fetching operations; and (iv-c) applying said PMSE for monitoring said CPU bus for detecting an actual CPU branch operation and for capturing an actual CPU branched or unbranched program path for releasing said PPSEs being assigned for one of said branch instructions which are not taken by said actual CPU branched or unbranched program path.

2. The method for transferring data between the high speed data processing system (DPS) and the low speed data storage (LSDS) unit of claim 1 wherein:

when a data read instruction is detected in said step (iv-a) or step (iv-c), fetching data according to said data read instruction from said LSDS to said HSDS via said MPBS if a location of data read in said LSDS is provided in said read instruction.

3. A method for transferring data between a high speed data processing system (DPS) and a low speed data storage (LSDS) unit, said system including a central processing unit (CPU), a prefetch processing unit (PPU) and a high speed data storage (HSDS) unit wherein said CPU, said PPU, and said HSDS are interconnected with a CPU address bus and a CPU data bus, and said LSDS and HSDS are interconnected with a multiple port bus (MPBS), wherein said MPBS having a data path wider than said CPU data bus to allow more data transferred in parallel between said HSDS and said LSDS at a lower speed than between a data transfer between said CPU and said HSDS, said method comprising the steps of:

(a) scanning signals from said CPU for determining whether an operation of said CPU is a data output operation, a data input operation or an instruction fetch operation;

(b) when an data output operation of said CPU is detected, holding up said output operation if said HSDS is full and receiving said signals from said CPU including data and an associated address, storing said signals in said HSDS if said HSDS is not full and transferring, concurrently with said step of receiving and storing said signals in HSDS, said signals stored in said HSDS to said LSDS through said multiple port bus;

(c) when a data input or an instruction fetch operation of said CPU is detected, checking said HSDS for determining whether said HSDS containing required data or instructions for said said input or instruction fetch operation of said CPU and (i) if said HSDS contains said required data or instructions, transferring said required data or instructions from said HSDS to said CPU; (ii) if said HSDS does not contain said required data or instructions, holding up said data input or instruction operation until said required data or instructions are retrieved from said LSDS; (iii) retrieving said required data or instructions from said LSDS; and (iv) applying said PPU to continuously decode instructions for said data input or an instruction fetch operation concurrently with said a plurality of program execution steps performed by said CPU; and (v) prefetching additional prefetched data or instructions in adjacent locations of said required data or instructions from said LSDS for transferring said required data or instructions together with said additional prefetched data or instructions to said HSDS through said multiple port bus.

* * * * *